US006947774B2

(12) United States Patent
Davis (10) Patent No.: US 6,947,774 B2
(45) Date of Patent: Sep. 20, 2005

(54) VARIABLE DELTA VOLTAGE TRACKING REGULATOR AND METHOD THEREFOR

(75) Inventor: Scott B. Davis, Walworth, WI (US)

(73) Assignee: Motorola, Inc., Schaumburg, IL (US)

( * ) Notice: Subject to any disclaimer, the term of this patent is extended or adjusted under 35 U.S.C. 154(b) by 546 days.

(21) Appl. No.: 09/756,522

(22) Filed: Jan. 8, 2001

(65) Prior Publication Data

US 2002/0128049 A1 Sep. 12, 2002

(51) Int. Cl.$^7$ ............................................... H04B 1/38
(52) U.S. Cl. ................................ 455/572; 331/113 R
(58) Field of Search ........................... 455/572, 127; 331/113 R (56) References Cited

U.S. PATENT DOCUMENTS

| | | | |
|---|---|---|---|
| 4,584,517 A | | 4/1986 | Schwob |
| 4,825,144 A | | 4/1989 | Alberkrack et al. |
| 4,882,531 A | | 11/1989 | Edwards et al. |
| 5,442,317 A | | 8/1995 | Stengel |
| 5,506,493 A | | 4/1996 | Stengel |
| 5,604,466 A | * | 2/1997 | Dreps et al. ............ 331/113 R |
| 2002/0128049 A1 | * | 9/2002 | Davis ......................... 455/572 |

* cited by examiner

Primary Examiner—William Cumming
(74) Attorney, Agent, or Firm—John J. King; Brian M. Mancini (57) ABSTRACT

A telematics communication system (100) receives an input supply voltage (Vin) (122) from a battery (102) charged by an alternator (101) in an automotive vehicle. The telematics communication system (100) includes a transceiver (104) having a transmitter (107) and a variable delta voltage tracking regulator (VDVTR) (109). The VDVTR (109) provides a regulated output supply voltage (Vout) (124) to a power amplifier (114) in the transmitter (107) responsive to the input supply voltage (122) and a regulator control voltage (TX_EN) (123). The VDVTR (109) has a first operating stage and a second operating stage, each controlled by a bias circuit (R1, R2 and R3), and a third operating stage, controlled by a voltage limiting circuit (D1) to eliminate alternator whine noise (405) that appears on the input supply voltage (122) and, in turn, appears on the regulated output supply voltage (Vout) (124).

21 Claims, 4 Drawing Sheets

SCHEMATIC OF THE VDVTR

METHOD FOR OPERATING THE VARIABLE DELTA VOLTAGE TRACKING REGULATOR (VDVTR)  300

VARIABLE DELTA VOLTAGE TRACKING REGULATOR AND METHOD THEREFOR

FIELD OF THE INVENTION

The present invention relates generally to voltage regulators, and more particularly to a variable delta voltage tracking regulator and method therefor for use in a cellular transceiver acting as a network access device in a telematics communication system.

BACKGROUND OF THE INVENTION

In many radio frequency (RF) technology applications, a voltage supply, providing power to a transmitter, has some level of noise on it. For example, when a transmitter is installed in an automotive vehicle, such as an automobile, an alternator in the automobile generates alternator whine noise that shows up on the voltage supply to the transmitter.

Due to the sensitivity of a RF power amplifier (PA) in the transmitter, especially in direct frequency modulation (FM) transmitters, noise on the RF PA causes amplitude modulation (AM) on the PA. This voltage supply fluctuation can be converted to FM by several paths such as direct AM to phase modulation (PM) conversion in the PA or by impedance reflections back to the PA (otherwise known as "load pull") causing a voltage controlled oscillator (VCO) in the transmitter to FM the noise. If the frequency-modulated noise is in baseband frequencies, including audio frequencies, the frequency-modulated noise will be on a signal transmitted by the transmitter to a corresponding receiver. The receiver will demodulate the frequency modulated noise on the signal to thereby degrade the received baseband signal. Isolating the PA from the voltage supply in the transmitter typically solves this problem.

Automobiles commonly use a large inductor-capacitor (LC) filter to reduce noise generated by the alternator. But to handle the current, frequency, and amplitude of the noise, an inductor of several cubic inches that is quite heavy is needed. Furthermore, there is a resistive drop in the inductor, causing a voltage drop to the PA and therefore putting tighter design constraints on the power output required at a given voltage level.

Automobiles also commonly regulate a product's supply voltage at a fixed voltage below an available voltage supply. However, when a battery is used for the available voltage supply, the fixed voltage drop needed to isolate the noise becomes a large part of the available voltage supply as the battery voltage lowers near the end of the battery's life. This too puts a large constraint on the PA design, requiring larger PA devices and higher current drain since the PA is required to operate at voltage supply levels lower than the available voltage supply. If the PA is not designed for the lower supply voltage level, the power output specifications of the product may not be met at the lower voltage levels.

Automotive vehicles, such as an automobile, sometimes use an analog 3W cellular transceiver as a telematics network access device (NAD). In some installations, the car's direct current (DC) battery voltage supply (B+) provides the voltage supply directly to the RF PA. Due to voltage limitations of the PA devices when the voltage supply from the battery rises above 18.5V, a voltage clamp circuit typically is used to limit the battery voltage supply to the PA to about 18V. With the voltage clamping circuit, the PA supply voltage is generally about 200 mV below the battery voltage supply, so it essentially follows the battery voltage supply. In a typical automobile, 18V is usually seen with excessive alternator whine on a "high line" battery voltage supply (i.e., 16V), or with load dump, or with dual battery voltage supplies (24V), as used with some commercial automobile starting systems. However, when alternator whine tests are performed on a cellular transceiver NAD, alternator whine noise in the form of hum and noise (H&N) is detected due to either AM to PM conversion, load pull on the VCO from PA impedance changes with the whine variation on the supply, or some other means. Hence, providing the PA with a supply voltage having much less noise would significantly improve the H&N performance during the alternator whine test.

Two alternatives are conventionally used to remove the alternator whine in a cellular transceiver NAD. First, a fast voltage regulator that is fast enough to remove voltage spikes and that is regulated at 10V may be used to provide the whine performance needed at "low line" battery supply voltages (i.e., 10V to 12V). However, a fast voltage regulator causes two problems: presently deployed PA's cannot produce enough power at 10V without being redesigned and the power dissipation in such a pass device at 16V would be about 6W thereby requiring excessive heat sinking and a very large pass device.

Second, a tracking regulator may be used to track the battery supply voltage at a fixed voltage below the battery supply voltage. The tracking regulator can also be designed using an adjustable regulator integrated circuit (IC) and can minimize the power dissipation problem at high voltages. To effectively remove alternator whine from the supply requires about 0.8V to 1V drop from the battery supply voltage when there are 1V whine humps and an even greater drop with higher whine humps. However, at lower battery supply voltages (10–12V), a voltage drop of greater than 1V could still not meet the Electronic Industry Association's (EIA) transmit power output requirements for a transmitter at a power step zero (i.e., the highest transmit power level).

The following U.S. patents disclose improvements or implementations for voltage regulators: U.S. Pat. Nos. 5,926,384; 5,828,620; 5,815,445; 5,703,470; 5,699,313; 5,635,816; 5,422,599; 5,406,523; 5,359,552; 5,353,215; 5,268,871; 5,267,201; 5,247,581; 5,903,612; 4,843,285; 4,811,236; 4,733,140; 4,656,553; 4,644,251; 4,378,530; 4,204,147; 4,189,670; 4,025,841; 3,967,312; 5,929,619; 5,642,033; 4,958,119; 4,791,349; 4,490,779; and 4,081,740. However, these patents do not teach or suggest, alone or in combination, using a voltage regulator to remove alternator whine.

Accordingly, there is a need for a voltage regulator for a cellular transceiver NAD that optimizes conflicting requirements of the EIA's transmit power output level and the requirement for the voltage drop between the battery supply voltage and the regulator output voltage to create the needed noise immunity, while giving operational priority to the EIA's transmit power output level.

BRIEF SUMMARY OF THE INVENTION

One aspect of the present invention includes a voltage regulator having a three terminals, where a first terminal is coupled to an input supply voltage (Vin), the second terminal provides a regulated output supply voltage (Vout), and the third terminal receives a regulator control voltage. The voltage regulator includes a bias circuit with a first resistor with two terminals with the first terminal being coupled to the third terminal of the voltage regulator to receive the regulator control voltage. The bias circuit also includes a second resistor having two terminals with the first terminal of the second resistor being coupled to the second terminal of the first resistor, and the second terminal of the second resistor being coupled to ground. The bias circuit also includes a third resistor having two terminals with the first terminal of the third resistor being coupled to the second terminal of the first resistor and the first terminal of the second resistor, and the second terminal of the third resistor being coupled to the input supply voltage. The voltage regulator also includes a summing circuit having five terminals with the first terminal forming a first input of the summing circuit having five terminals with the first terminal forming a first input of the summing circuit and being coupled to the second terminal of the first resistor and the first terminal of the second resistor and the first terminal of the third resistor. The second terminal of the summing circuit forms a second input of the summing circuit and is coupled to the third terminal of the summing circuit that forms an output of the summing circuit to provide the regulated output supply voltage responsive to the regulator control voltage and the input supply voltage. The fourth terminal of the summing circuit forms a third input of the summing circuit, being coupled to the input supply voltage. The fifth terminal of the summing circuit is coupled to ground.

Another aspect of the present invention has the voltage regulator include a voltage limiting circuit having a two terminals with the first terminal of the voltage limiting circuit being coupled to the second terminal of the first resistor and the first terminal of the second resistor and the first terminal of the third resistor, and the second terminal of the voltage limiting circuit being coupled to ground. The voltage regulator has a first operating stage and a second operating stage, each determined by the bias circuit. The first operating stage of the bias circuit sets the regulated output supply voltage to be equal to the input supply voltage when the input supply voltage is less than or equal to the input supply voltage when the input supply voltage is less than or equal to a first predetermined voltage responsive to the regulator control voltage and the input supply voltage. The second operating stage of the bias circuit setting the regulated output supply voltage to be equal to a predetermined function of the input supply voltage when the input supply voltage is between a first predetermined voltage and a second predetermined voltage, greater than the first predetermined voltage, and responsive to the regulator control voltage and the input supply voltage. A third operating stage, determined by the voltage to be equal to a maximum predetermined voltage when the regulated output supply voltage is greater than or equal to a second predetermined voltage responsive to the regulator control voltage and the input supply voltage.

Another aspect of the present invention includes a telematics control unit coupled with a transceiver and being coupled to receive an input supply voltage (Vin) from a battery that is charged by an alternator in an automotive vehicle. The transceiver includes a voltage regulator of any of the aspects described herein. The transceiver also includes a transmitter having a power amplifier coupled to receive the regulated output supply voltage. The telematics control unit is coupled with a user interface, the transceiver, and an antenna.

Another aspect of the present invention includes an automotive vehicle with an alternator, a battery that is charged by the alternator and adapted to provide an input supply voltage (Vin) for electrical devices in the automotive vehicle, and a telematics control unit of any of the aspects described herein. The transceiver also includes a transmitter having a power amplifier coupled to receive the regulated output supply voltage. The telematics control unit is coupled with a user interface, the transceiver, and an antenna.

Another aspect of the present invention includes a technique for voltage regulation including receiving an input supply voltage (Vin) and a regulator control voltage. The regulator control voltage has two voltage levels. The technique includes producing a regulated output supply voltage (Vout) having a first voltage level, being a ground potential, responsive to the first voltage level of regulator control voltage. The second voltage level, being variable, is responsive to the second voltage level of regulator control voltage and the input supply voltage. The second voltage level of the regulated output supply voltage is set: equal to the input supply voltage when the input supply voltage is less than or equal to a first predetermined voltage, and equal to a predetermined function of the input supply voltage when the input supply voltage is between a first predetermined voltage and a second predetermined voltage, greater than the first predetermined voltage, to create an increasing voltage delta between the input supply voltage and the regulated output supply voltage.

Another aspect of the present invention includes a technique for reducing alternator whine nose while giving operational priority to a transmit power output level of the transmitter using a voltage regulator in a telematics communication system adapted for use in an automotive vehicle. The voltage regulation technique includes any of the aspects described herein.

DETAILED DESCRIPTION OF A PREFERRED EMBODIMENT

In a preferred embodiment of the present invention, a variable delta voltage tracking regulator (VDVTR) 109 for a cellular transceiver NAD 104 optimizes the conflicting requirements of the EIA's transmit power output level and the requirements of the voltage drop 404 between the battery supply voltage 122 and the regulated output supply voltage 124 to create the needed noise immunity. The VDVTR 109 optimizes the conflicting requirements by creating a variable delta 404 over a portion of the VDVTR's operating range. The VDVTR 109 also incorporates fixed or clamped output voltage supply to limit a maximum output voltage supply Vmax of the VDVTR 109 regardless of the input voltage supply 122 to the VDVIR 109.

As a brief overview of the preferred embodiment of the present invention, at a low battery supply voltage (B+) 122, such as 10 or 11V, where no voltage drop can be tolerated, regulated output supply voltage 124 of the VDVTR 109 tracks the battery supply voltage 122. Then, at a medium battery supply voltage, such as 12–14V, a higher voltage drop 404, such as 1V, is tolerated to create immunity to an alternator whine noise. The voltage drop 404, otherwise known as a difference or delta, between the battery supply voltage 122 and the regulated output supply voltage 124 of the VDVTR 109 then linearly increases as the battery supply voltage 122 increases to a maximum supply voltage Vmax of the PA 114. Then, at the maximum supply voltage Vmax of the PA 114, such as 16V, the regulated output supply voltage 124 of the VDVTR 109 is clamped at 16V regardless of the battery supply voltage 122 at the input of the VDVTR 109. Hence, the VDVTR 109 optimizes the conflicting requirements of EIA's transmit power output level versus the voltage drop 404 between the battery supply voltage 122 and the regulated output supply voltage 124 to create the needed noise immunity, while giving operational priority to the EIA's transmit power output level.

Therefore, the VDVTR 109 has requirements and operates as follows:

1. At B+=11V, the regulated output supply voltage 124 is approximately 11V.
2. At B+=12V, the regulated output supply voltage 124 is approximately 0.8–1.0V below B+.
3. At B+=14V, the regulated output supply voltage 124 is approximately 1.5–2.0V below B+.
4. The regulated output supply voltage 124 clamps at a maximum of 18V, but not less than 16V.
5. Handle a 100 mA to 1A load.
6. At turn on, the VDVTR 109 reaches its final output within 100 ms.
7. When a transmit enable (TX_EN) signal 123 goes low, VDVTR 109 current drain is less than 10 uA.
8. VDVTR 109 is functional down to 8V.
9. VDVTR 109 withstands 24V for one minute without any permanent damage.
10. Alternator whine noise 405 on B+ (IV humps and 3V spikes) does not contribute to H&N at 14V.

Figure 1:
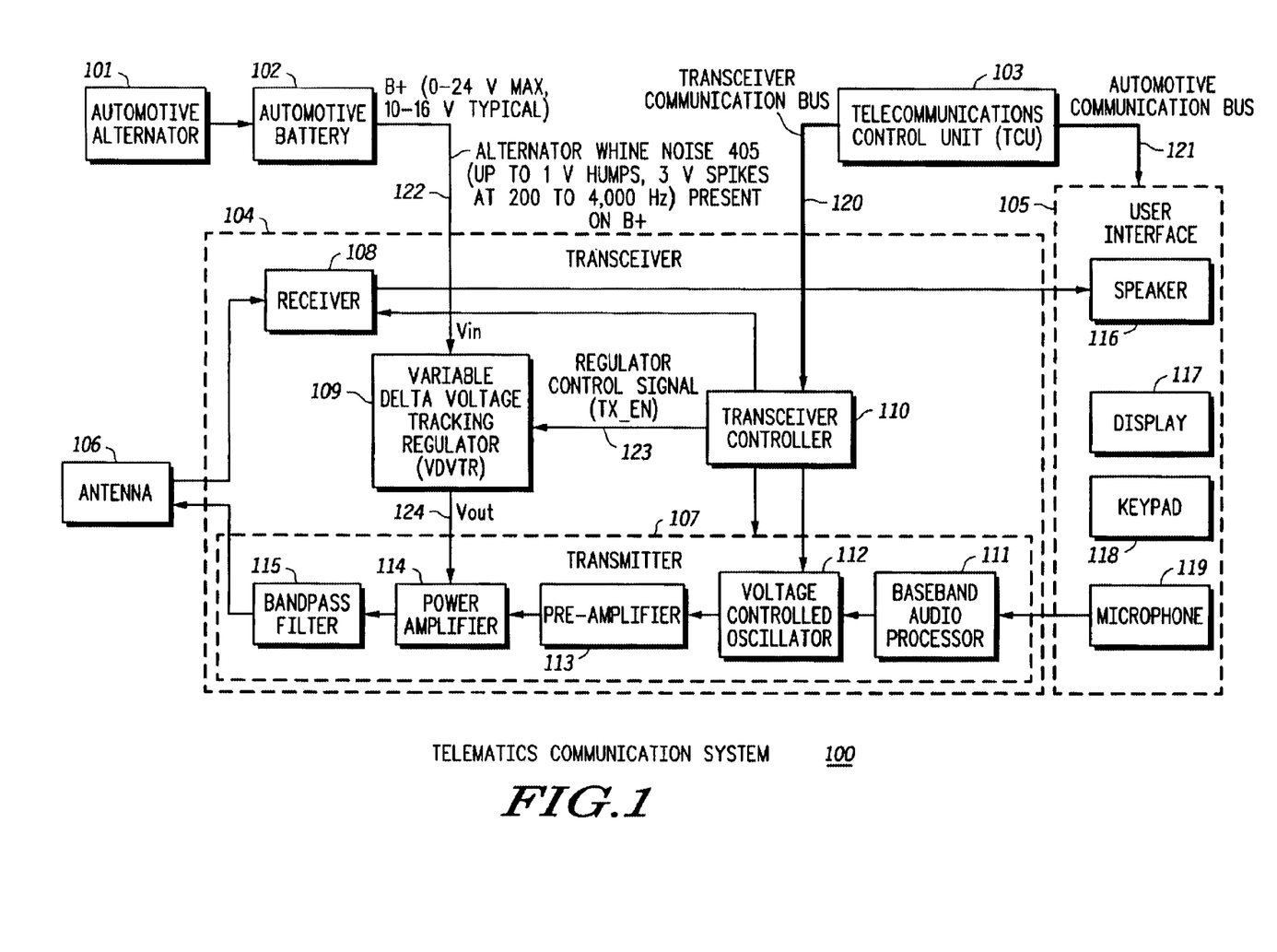
FIG. 1 illustrates a block diagram of a telematics communication system, installed in an automotive vehicle, including a radio frequency transceiver having a VDVTR coupled to a battery of the automotive vehicle in accordance with a preferred embodiment of the present invention.

Referring now to the figures, FIG. 1 illustrates a block diagram of a telematics communication system 100, installed in an automotive vehicle, including a radio frequency transceiver 104 having a VDVTR 109 coupled to a battery 102 of the automotive vehicle in accordance with a preferred embodiment of the present invention.

The automotive vehicle generally includes the telematics communication system 100 coupled to the battery 102 that is charged by an alternator 101 of the automotive vehicle. The automotive vehicle is preferably a car or a truck, but may be any land, air or water traveled vehicle, wherein an alternator charges a battery. Other such vehicles, include without limitation, a plane, a boat, a train, a motorcycle, and the like. The output voltage supply (B+) 122 of the battery 102 can have alternator whine noise 405 having 1 volt humps in the 200 Hz to 4 KHz frequency range.

The telematics communication system 100 generally includes a transceiver 104, an antenna 106, a telematics control unit 103 and a user interface 105. The transceiver 104 generally includes a transmitter 107, a receiver 108, a cellular controller 110 and the VDVTR 109. The transmitter 107 generally includes a baseband audio processor 111, a voltage controlled oscillator (VCO) 112, a preamplifier 113, a power amplifier (PA) 114, and a bandpass filter 115. The user interface 105 generally includes a microphone 119, a speaker 116, a display 117 and a keypad 118.

The transceiver 104 and telematics control unit 103 are typically integrated into one housing and is typically provided by a cellular telephone manufacturer for installation in a discrete location, such as in a trunk, in a dashboard, or under a seat in a car or truck. Alternatively, the telematics control unit 103 may be in a housing separate from the transceiver 104 and provided by an automotive vehicle manufacturer. Further, automotive design engineers or installation technicians install or integrate the user interface 105 in a discrete location, such as into a dashboard, steering wheel, sun visor or the like of a car or truck. Likewise, automotive design engineers or installation technicians typically install the antenna 106 at a remote position relative to the transceiver 104, such as integrated with a vehicle's entertainment system antenna, integrated with glass (as in a front wind shield), or mounted on a roof of a vehicle.

The telematics communication system 100, installed in an automotive vehicle as shown in FIG. 1, is generally well known in the art, with the exception of the VDVTR 109. The preferred embodiment of the present invention relates to the form and function of the VDVTR 109 in the transceiver 104 in the telematics communication system 100. The battery 102 provides a DC voltage supply 122 to the transceiver 104 and the telematics control unit 103. The telematics control unit 103 communicates with the transceiver 104 over a transceiver communication bus 120. The telematics control unit 103 communicates with the display 117 and keypad 118 in user interface 105 over an automotive communication bus 121. The transceiver communication bus 120 may be separate from or the same as the automotive communication bus 121, depending on various design and installation considerations. The antenna 106 is coupled to the transmitter 107 to radiate a transmit signal generated by the transmitter 107, and is coupled to the receiver 108 to a receive signal for demodulation by the receiver 108. The speaker 116 in the user interface 105 is coupled to the receiver 108 to convert an electrical signal produced by the receiver 108 to an acoustic output signal. The microphone 119 in the user interface 105 is coupled to the transmitter 107 to convert an acoustic signal to an electrical signal for transmission by the transmitter 107.

In the transceiver 104, the transceiver controller 110 transmits and receives the communications signals over the transceiver communication bus 120. The transceiver controller 110 controls the receiver 108, the transmitter 107 and the VDVTR 109. The VDVTR 109 has a first input terminal for receiving the battery supply voltage 122, a second input terminal for receiving a regulator control voltage signal 123 (i.e., a transmit enable or TX_EN signal) from the transceiver controller 110 and an output terminal for generating a regulated output supply voltage 124. The regulated output supply voltage 124 from the VDVTR 109 provides voltage to the power amplifier 114 in the transmitter 107. The regulator control signal 123 typically has two states. A first state of the regulator control signal 123 is a logic one signal (i.e., a high voltage signal) for enabling the VDVTR 109. A second state of the regulator control signal 123 is a logic zero signal (i.e., a low voltage signal) for disabling the VDVTR 109. When the VDVTR 109 is enabled, the VDVTR 109 generates the regulated output supply voltage 124 for the power amplifier 114 in the transmitter 107 and thereby enables the transmitter 107. When the VDVTR 109 is disabled, the VDVTR 109 does not generate the regulated output supply voltage 124 for the power amplifier 114 in the transmitter 107 and thereby disables the transmitter 107. Hence, the regulator control signal 123 is otherwise known as the transmit enable or TX_EN signal because it enables and disables the transmitter 107 via the power amplifier 114.

In the transmitter 107, the baseband audio processor 111 receives the electrical signal from the microphone 119 in the user interface 105 and generates a baseband audio signal. The VCO 112 receives the baseband audio signal from the baseband audio processor 111 and generates a voltage control signal responsive to a VCO control signal. The preamplifier 113 receives the voltage controlled signal from the VCO 112 and generates a first amplified signal. The power amplifier 114 receives the first amplified signal from the preamplifier 113 and generates a second amplified signal. The bandpass filter 115 filters the second amplified signal to produce a transmit signal. The antenna 106 radiates the transmit signal.

A hardware component of the telematics communication system 100 is the telematics control unit 103. The telematics control unit 103 is a robust unit well-suited to the harsh automotive environment. The telematics control unit 103, which communicates with a central service center (not shown) via the transceiver 104, serves as a central platform where all telematics related technologies are integrated. The telematics control unit 103 communicates location specific information to the central service center and, in turn, the central service center delivers telematics services to a person in the automotive vehicle via the telematics control unit 103. Telematics services include dispatching emergency services, sending roadside assistance, delivering navigation assistance and providing real-time traffic information, among others. The telematics control unit 103 can be connected to an engine control unit (i.e., the on-board computer, not shown) that enables an enhanced service such as remote engine diagnostics.

In addition to the hardware component of the telematics control unit 103, the telematics communication system 100 also includes unique software for various components in the telematics communication system 100. Each component is programmed with software to allow various portions of the telematics communication system 100 to operate as if they were integrated together. For example, software allows a global positioning satellite (GPS) (not shown) and the telematics control unit 103 to interact with one another to relay location information to the central service center, thereby enabling rendering of necessary services to the automotive vehicle. Other software permits delivery of even more sophisticated communications, including Internet access, information and entertainment on demand, Email, and interaction with e-commerce sites.

Applications for the telematics communication system 100 include: automatic emergency call and response upon airbag deployment, driving directions responsive to a driver's current location, roadside assistance that pinpoints a disabled vehicle, remote control of vehicle's electrical functions such as locking or unlocking doors and stolen vehicle tracking, readily available customer assistance, synchronizing with personal digital assistant (PDA) devices to allow out-of-office information downloads, enhanced service center and network supporting "car meetings" and other tasks, incorporation of real-time traffic information to enhance navigation effectiveness, remote vehicle diagnostics, development of a personal area network permitting seamless integration of the automotive vehicle with other communication and computing platforms including automatic handoff between a hands-free vehicle phone and a portable handset and wireless updates of all calendars, contact lists, etc., synchronization with local merchants and service providers for "push" information and e-commerce, secure access to private data networks, including office e-mail systems, customized information and entertainment on demand including news, financials, weather, sports, audio books, music and games, and over-the-air reprogramming of on-board computer.

Figure 2:
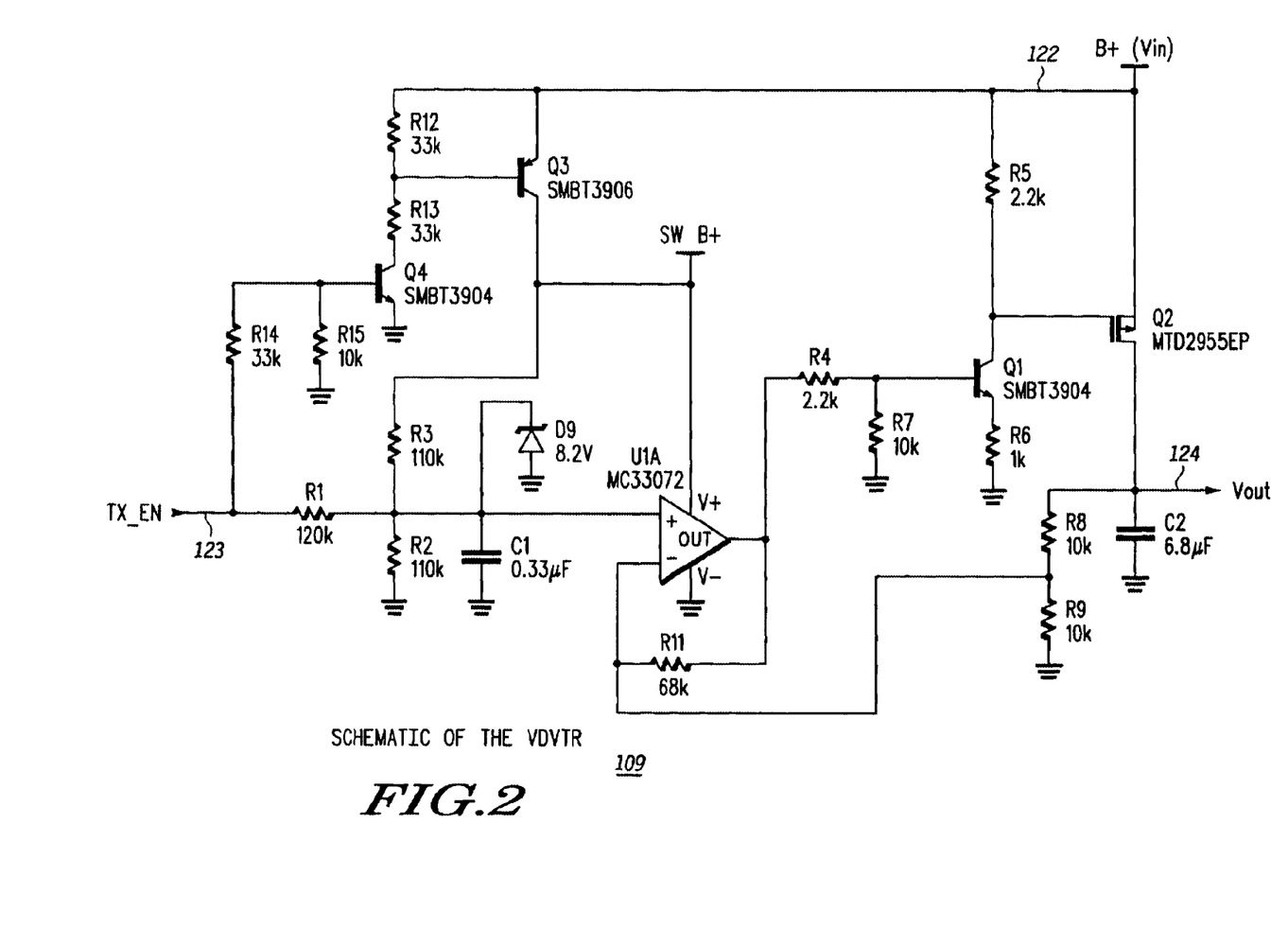
FIG. 2 illustrates a schematic diagram of the VDVTR illustrated in FIG. 1 in accordance with a preferred embodiment of the present invention.

FIG. 2 illustrates a schematic diagram of the VDVTR 109 illustrated in FIG. 1 in accordance with a preferred embodiment of the present invention. The schematic diagram of the VDVTR 109 has the following reference numbers, corresponding description and corresponding value or part number.

| Reference | Description | Value or Part Number |
| --- | --- | --- |
| R1 | resistor | 120 K ohms |
| R2 | resistor | 110 K ohms |
| R3 | resistor | 110 K ohms |
| R4 | resistor | 2.2 K ohms |
| R5 | resistor | 2.2 K ohms |
| R6 | resistor | 1 K ohms |
| R7 | resistor | 10 K ohms |
| R8 | resistor | 10 K ohms |
| R9 | resistor | 10 K ohms |
| R11 | resistor | 68 K ohms |
| R12 | resistor | 33 K ohms |
| R13 | resistor | 33 K ohms |
| R14 | resistor | 33 K ohms |
| R15 | resistor | 10 K ohms |
| C1 | capacitor | 0.33 microF |
| C2 | capacitor | 6.8 microF |
| C3 | capacitor | 0.05 microF |
| Q1 | NPN transistor | SMBT3904 |
| Q2 | field effect transistor (FET) | MTD2955 |
| Q3 | PNP transistor | SMBT3906 |
| Q4 | NPN transistor | SMBT3904 |
| U1A | operational amplifier | MC33072 |
| D1 | zener diode | D1N5237 |
| B+ (Vin) | battery voltage supply | 0–24 V maximum, 10–16 V typical |
| SW B+ | switched battery supply voltage | same as B+ minus Vce-sat drop of Q3 |
| Vout | output voltage supply | 0–16 V maximum |
| TX_EN | regulator control signal | 0 V (low), 4.75 V (high) |

The VDVTR 109 generally includes a switched battery supply voltage (SW B+) circuit (R12, R13, R14, R15, Q3, and Q4), a bias circuit (R1, R2 and R3), a noise filter (C1), an output voltage limit circuit (D1), a summing circuit (U1A, R11), a driving circuit (R4, R5, R6, R7 and Q1), an output driver circuit (Q2), a feedback circuit (R8 and R9), and a stabilization circuit (C2.

The switched B+ circuit switches on and off the battery supply voltage (B+) responsive to the regulator control signal, TX_EN, to produce a switched battery supply voltage (SW B+). When TX_EN is high (e.g., 4.75V) and low (e.g., 0V), Q4 and Q3 are turned on and off, respectively. Therefore, the SW B+ circuit enables and disables the operational amplifier U1A, via the SW B+, and the bias circuit to the operational amplifier U1A, via R1, R2 and R3, when TX_EN is high and low, respectively. The VDVTR 109 has no effective current drain when TX_EN is low because Q4 and Q3 are turned off thereby disabling a base terminal drive to Q1. When Q1 is off, a gate terminal of Q2 is pulled high by R5 to thereby disable Q2 and causing the VDVTR's output voltage supply 124 to drop to 0V.

The bias circuit (R1, R2 and R3) provides a bias condition for the summing circuit (U1A, R11).

The noise filter (C1) removes noise from SW B+ so that a clean DC reference voltage remains.

The output voltage limit circuit (D1) is a zener diode that limits the VDVTR's output voltage supply (Vout) according to the equation Vout−max=Vzener [(R9+R8)/R9], wherein Vzener is the characteristic voltage of the zener diode (D1).

The summing circuit (U1A, R11) is an operational amplifier configured as a summing circuit. Each of the inputs to the summing circuit (U1A, R11) are set at 7 V nominal which is about one half of the SW B+ to permit a plus or minus 7 V swing about the bias point. Preferably, the summing circuit (U1A, R11) is implemented as a MC33072 operational amplifier to get a high slew rate (e.g., about 10V/us). With a standard operational amplifier, such as the LM2904, the slew rate is too slow to respond to alternator whine spikes and allows them to pass through to the regulated output voltage supply Vout 124.

In the driving circuit (R4, R5, R6, R7 and Q1), R4 and R7 drive Q1. R7 compensates for the lack of rail to rail drive of the summing circuit (U1A, R11) and ensures that Q1 will turn off. The ratio of R4/R7 requires a calculated value that is not too small or too large. If the ratio of R4/R7 is too large, then Q1 will not turn on enough to raise the output voltage. If the ratio of the R4/R7 is too small, then the output drive transistor, FET, Q2 will be saturated all the time.

In the feedback circuit (R8 and R9), R8 and R9 determine the voltage at which the output drive transistor, FET, Q2 comes out of saturation.

The stabilization circuit (C2) stabilizes the VDVTR 109 with a large value, low ESR, tantalum capacitor (ESR approximately 2 ohms).

In the preferred embodiment of the present invention, the bias circuit (R1, R2 and R3) plays a special role in turning an otherwise conventional voltage regulator into the VDVTR 109.

Figure 3:
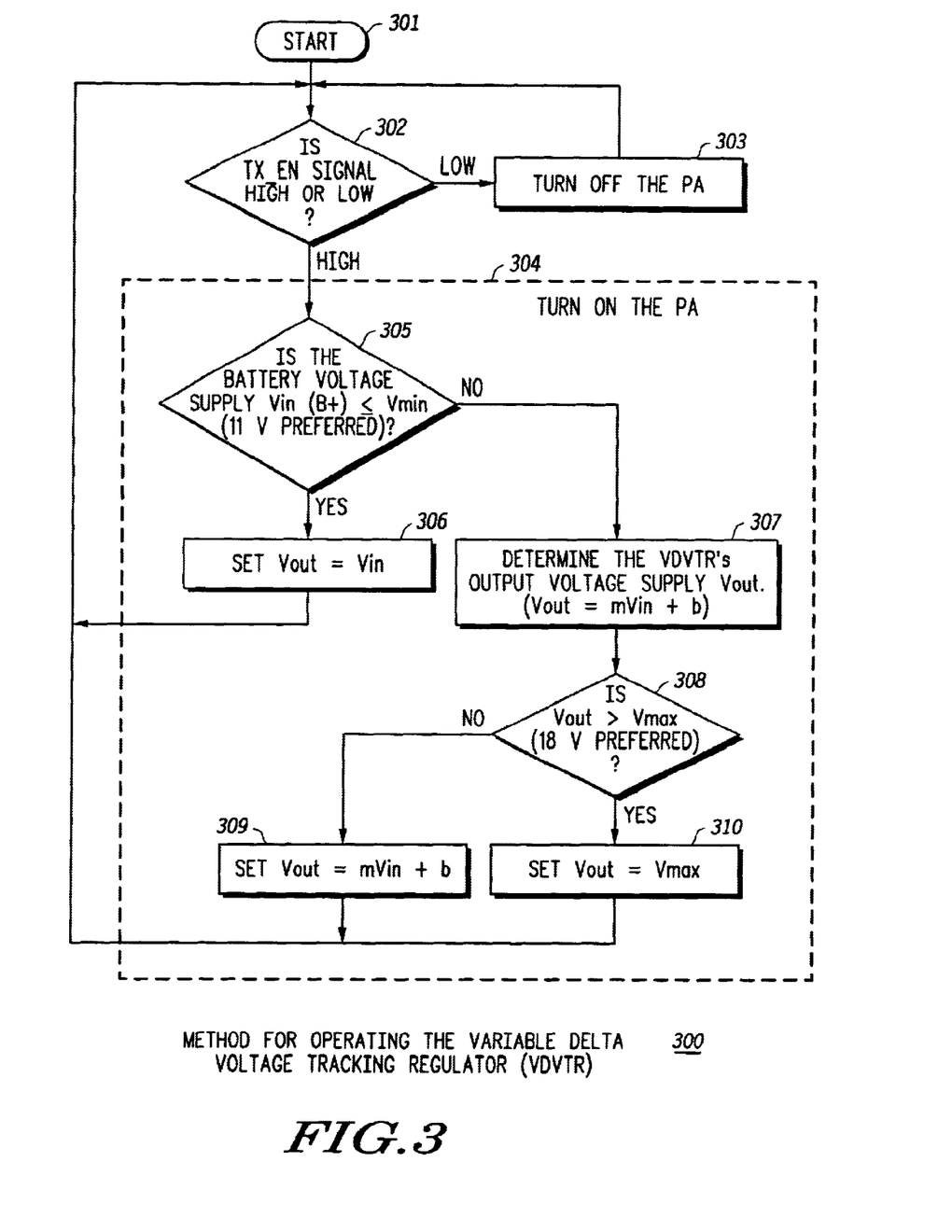
FIG. 3 illustrates a flowchart describing a method performed by the schematic diagram of the VDVTR illustrated in FIG. 2 in accordance with a preferred embodiment of the present invention.

Assume for a moment that the bias circuit (R2 and R3) is not present in FIG. 3 with R1 replaced by a short. If the bias circuit (R1, R2, and R3) were not present, such a voltage regulator would be similar to a conventional adjustable voltage regulator integrated circuit (IC), wherein the output voltage supply Vout is adjusted by R8 and R9 and referenced to TX-EN at the positive input of opamp U1A. In this case, the summing circuit (U1A, R11) is powered from SW B+ that allows a reference to be near the middle of the input voltage range of the summing circuit (U1A, R11). The regulated output voltage supply of the regulator is divided approximately in half by the feedback circuit (R8 and R9) to keep the feedback voltage in the input range of the summing circuit (U1A, R11). An error signal from the summing circuit (U1A, R11) drives transistor Q1. Transistor Q1 is not needed for gain, but primarily is used to disable the FET Q2 when TX_EN is low. Since the summing circuit (U1A, R11) does not have an open collector, when SW B+ is removed, its output voltage goes low rather than high as with the transistor Q1. The transistor Q1 is also used to invert the signal from the summing circuit (U1A, R11), but this signal inversion would not be needed if the summing circuit (U1A, R11) input terminals were swapped.

Next, assume that only R2 and R3 of the bias circuit are present without R1 (R1 open). In this case, such a voltage regulator would be configured as a conventional fixed delta voltage tracking regulator, wherein the output voltage supply Vout tracks the battery voltage supply (B+) at a fixed voltage difference.

Next, assume that only R1 of the bias circuit is present without R2 and R3. In this case, such a voltage regulator would be configured as a conventional voltage tracking regulator, wherein the output voltage supply Vout tracks the battery voltage supply (B+).

In the preferred embodiment of the present invention, R1, R2 and R3 in the bias circuit are used in combination to provide the variable delta voltage tracking regulator (VDVTR) 109. The output voltage supply Vout changes with various levels of SW B+ at a variable rate due to the fixed voltage of TX_EN.

Adjusting R1 controls the slope (or rate of change) of the regulated output voltage supply Vout 124 in the region of SW B+ (e.g., greater than 11V). Further details of the operation of the bias circuit are described with reference to FIGS. 3 and 4.

FIG. 3 illustrates a flowchart describing a method performed by the schematic diagram of the VDVTR 109 illustrated in FIG. 2 in accordance with a preferred embodiment of the present invention.

At step 301, the method starts.

At step 302, the VDVTR 109 determines whether the regulator control signal, TX_EN, 123 is a high voltage level, such as 4.75 V, representing a logic 1 state, or a low voltage level, such as 0 V, representing a logic 0 state, for turning on and off, respectively, the VDVTR 109 to thereby turn on and off, respectively, the power amplifier 114 in the transmitter 107. If the VDVTR 109 determines that the TX_EN 123 is a high voltage level, then the method continues to step 304. If the VDVTR 109 determines that the TX_EN 123 is a low voltage level, then the method continues to step 303.

At step 303, the VDVTR 109 is turned off, responsive to the VDVTR 109 determining that the TX_EN 123 is a low voltage level to thereby turn off the power amplifier 114 in the transmitter 107.

At step 304, the VDVTR 109 is turned on, responsive to the VDVTR 109 determining that the TX_EN 123 is a high voltage level to thereby turn on the power amplifier 114 in the transmitter 107. However, in accordance with a preferred embodiment of the present invention, when the VDVTR 109 is turned on, the output voltage supply Vout of the VDVTR 109 varies relative to the battery supply voltage (Vin) 122. This relationship between Vout and Vin is further described with reference to method steps 305 through 310. Generally, the relationship between Vout and Vin is described in three operating stages (otherwise, graphically referred to as regions or zones). The three operating stages generally include a first operating stage, a second operating stage and a third operating stage. The first operating stage is described with reference to steps 305 and 306. The second operating stage is described with reference to steps 307, 308 and 309. The third operating stage is described with reference to steps 307, 308 and 310.

At step 305, the VDVTR 109 determines whether the battery supply voltage (B+) Vin 122 is less than or equal to a first predetermined voltage level Vmin. According to the preferred embodiment of the present invention, the first predetermined voltage level Vmin is between 8 V and 11 V, and is preferably 11 V. If the VDVTR 109 determines that the battery supply voltage (B+) Vin 122 is less than or equal to a first predetermined voltage level Vmin, then the method continues to step 306. If the VDVTR 109 determines that the battery supply voltage (B+) Vin 122 is not less than or equal to a first predetermined voltage level Vmin, then the method continues to step 307.

At step 306, the VDVTR's regulated output supply voltage Vout 124 is set to equal to the battery supply voltage (B+) Vin 122. Hence, according to the preferred embodiment of the present invention, the VDVTR's regulated output supply voltage Vout 124 tracks any changes in the battery supply voltage (B+) Vin 122 between 0 V and 11 V. For example, if the battery supply voltage (B+) Vin 122 is 9 V, then the VDVTR's regulated output supply voltage Vout 124 is also 9 V (minus Vds-on of Q2). According to the preferred embodiment of the present invention, the VDVTR 109 does not have enough drive to turn on the transistor Q2 below 8V. However, the VDVTR 109 is only required to operate down to 8V. The first operating stage of the VDVTR 109 describes the VDVTR's regulated output supply voltage Vout 124 when the battery supply voltage (B+) Vin 122 is between 0 V and 11 V.

At step 307, the VDVTR's regulated output supply voltage Vout 124 is determined as a predetermined function of the battery supply voltage (B+) Vin 122 plus a constant value (Vout=mVin+b). This equation is an application of a well known algebraic equation "y=mx+b" to determine a slope of a line, wherein "m" determines the slope of the line and "b" determines an offset from an origin. Hence, Vout and Vin preferably have a linear relationship to each other. Alternatively, the Vout and Vin may have other predetermined functional relationships to each other that are not linear. Regardless of the type of predetermined functional relationship, the variable voltage delta 404 between the battery supply voltage (B+) Vin 122 and the VDVTR's regulated output supply voltage Vout 124 is needed to create the immunity against noise present on the battery supply voltage (B+) Vin 122.

At step 308, the VDVTR 109 determines whether the VDVTR's regulated output supply voltage Vout 124 is greater than the VDVTR's maximum output supply voltage Vmax. If the VDVTR 109determines that the VDVTR's regulated output supply voltage Vout 124 is greater than the VDVTR's maximum output supply voltage Vmax, then the method continues to step 309. If the VDVTR determines that the VDVTR's regulated output supply voltage Vout 124 is not greater than the VDVTR's maximum output supply voltage Vmax, then the method continues to step 310.

At step 309, the VDVTR 109 sets the VDVTR's regulated output supply voltage Vout 124 to be equal to the VDVTR's maximum output supply voltage Vmax.

At step 310, the VDVTR's regulated output supply voltage Vout 124 is set to equal a predetermined function of the battery supply voltage (B+) Vin 122 plus a constant value (Vout=mVin+b). According to the preferred embodiment of the present invention, the VDVTR's regulated output supply voltage Vout 124 tracks any changes in the battery supply voltage (B+) Vin above 11 V. Preferably, a slope of the line for Vout=mVin+b is less than a slope of a line for Vout=Vin. As the battery supply voltage (B+) Vin 122 increases above 11 V, the VDVTR's regulated output supply voltage Vout 124 also increases, but at a slower rate. Therefore, the greater the battery supply voltage (B+) Vin 122 increases above 11 V, the greater the voltage delta 404 (otherwise known as a "difference" or "drop") between the battery supply voltage (B+) Vin 122 and the VDVTR's regulated output supply voltage Vout 124.

This variable voltage delta 404 provides the needed isolation between the battery supply voltage (B+) Vin 122 and the VDVTR's regulated output supply voltage Vout 124 to advantageously remove alternator whine noise from the battery supply voltage (B+) Vin 122, while giving operational priority to the EIA's transmit power output level. When the voltage delta 404 is relative small, the isolation against alternator whine noise is relative small. Likewise, when the voltage delta 404 is relative large, the isolation against alternator whine noise is relative large. According to the preferred embodiment of the present invention, a voltage delta 404 of about 0.8V to 1V drop from the battery supply voltage (B+) Vin 122 is needed when there are 1V alternator whine noise humps and an even greater voltage delta 404 is needed with higher alternator whine noise humps. However, at lower battery supply voltages (B+) Vin 122 (e.g., 10–12V) a voltage delta 404 of greater than 1V would not meet the Electronic Industry Association's (EIA) transmit power output requirements for a transmitter 107 at a power step zero (i.e., the highest transmit power level). To give operational priority to the EIA's transmit power output level while permitting some alternator whine noise to be present on the VDVTR's regulated output supply voltage Vout 124, at a low battery supply voltage (B+) Vin 122 (e.g., 0–11 V), the VDVTR's regulated output supply voltage Vout 124 is set to equal the battery supply voltage (B+) Vin 122. Then, at somewhat higher battery supply voltages (B+) Vin 122 (e.g., 11–13 V), the delta between the VDVTR's regulated output supply voltage Vout 124 and the battery supply voltage (B+) Vin 122 increases but remains relatively small. At these somewhat higher battery supply voltages (B+) Vin 122, the increased voltage delta 404 causes greater immunity to the alternator whine noise while continuing to give operational priority to the EIA's transmit power output level. Then, at the high battery supply voltages (B+) Vin 122 (e.g., 13–16 V), the delta between the VDVTR's regulated output supply voltage Vout 124 and the battery supply voltage (B+) Vin 122 continues to increase to a maximum voltage delta at the highest battery supply voltages (B+) Vin 122. At these high battery supply voltages (B+) Vin 122, the increased voltage delta 404 causes even greater immunity to the alternator whine noise while continuing to meet the requirements of the EIA's transmit power output level. The variable voltage delta 404 between the VDVTR's regulated output supply voltage Vout 124 and the battery supply voltage (B+) Vin 122 is referred to as the second operating range of the VDVTR 109. Therefore, the variable voltage delta 404 optimizes the conflicting requirements of the EIA's transmit power output level and the requirements of the voltage drop between the battery supply voltage (B+) Vin 122 and the VDVTR's regulated output supply voltage Vout 124 to create the needed noise immunity, while giving operational priority to the EIA's transmit power output level at low battery supply voltages (B+) Vin 122.

Figure 4:
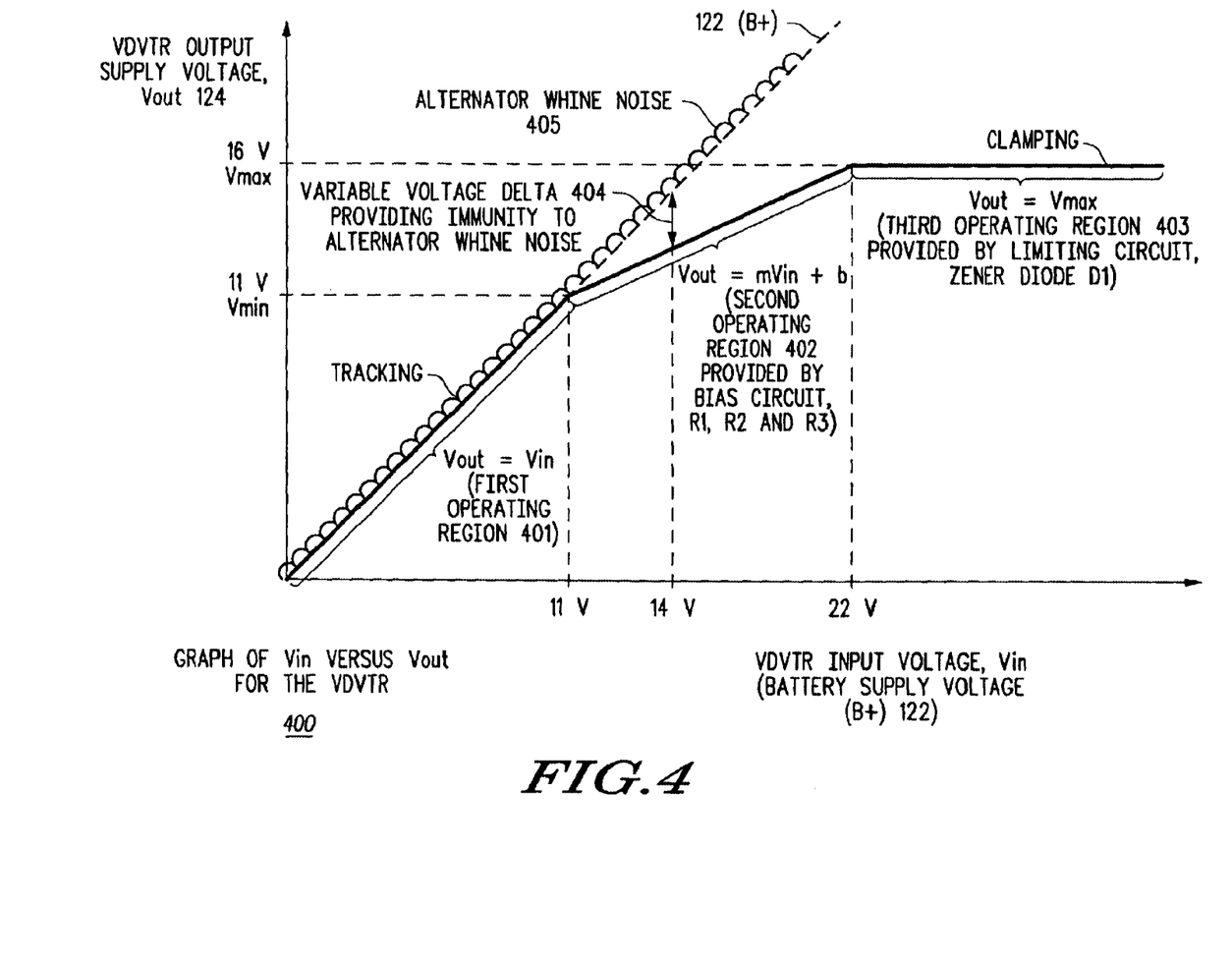
FIG. 4 illustrates a graph of an input voltage signal versus an output voltage signal for the schematic diagram of the VDVTR illustrated in FIG. 2 operating according to the method illustrated in FIG. 3 in accordance with a preferred embodiment of the present invention.

FIG. 4 illustrates a graph 400 of an input voltage signal 122 versus an output voltage signal 124 for the schematic diagram of the VDVTR 109, illustrated in FIG. 2, operating according to the method illustrated in FIG. 3 in accordance with a preferred embodiment of the present invention.

The VDVTR 109 has a first operating stage and a second operating stage, each determined by a bias circuit, and a third operating stage, controlled by a voltage limiting circuit. In FIG. 4, the first operating stage, the second operating stage and the third operating stage are represented graphically as the first operating region 401, the second operating region 402 and the third operating region 403, respectively.

In the first operating region 401, the bias circuit (R1, R2 and R3) of the VDVTR 109 sets the regulated output supply voltage Vout 124 to be equal to the input supply voltage Vin 122 (i.e., Vout=Vin) when the input supply voltage 122 is less than or equal to a first predetermined voltage Vmin, responsive to the regulator control voltage 123 and the input supply voltage Vin 122, to permit the presence of the alternator whine noise 405 on the regulated output supply voltage 124 while giving operational priority to the transmit power output level of the transmitter 107.

In the second operating region 402, the bias circuit (R1, R2 and R3) of the VDVTR 109 sets the regulated output supply voltage 124 to be equal to a predetermined function of the input supply voltage Vin 122 (e.g., Vout=mVin+b) when the input supply voltage Vin 122 is between the first predetermined voltage Vmin and a second predetermined voltage Vmax, greater than the first predetermined voltage Vmin, responsive to the regulator control voltage 123 and the input supply voltage Vin 122. The predetermined function creates a gradually increasing voltage delta 404 between the input supply voltage Vin 122 and the regulated output supply voltage 124 to thereby gradually reduce the alternator whine noise on the regulated output supply voltage 124 while continuing to meet operational requirements of the transmit power output level of the transmitter 107 at relatively low output supply voltage levels 124 in the range of 8–12 V.

In the third operating region 403, the voltage limiting circuit, provided by the zener diode D1 (8.2V), sets the regulated output supply voltage 124 to be equal to a maximum predetermined voltage Vmax (i.e., Vout=Vmax) when the regulated output supply voltage 124 is greater than or equal to the second predetermined voltage Vmax, responsive to the regulator control voltage 124 and the input supply voltage Vin 122.

Hence, while the present invention has been described with reference to various illustrative embodiments thereof, the present invention is not intended that the invention be limited to these specific embodiments. Those skilled in the art will recognize that variations and modifications can be made without departing from the spirit and scope of the invention as set forth in the appended claims.

What is claimed is:

1. A voltage regulator having a first terminal, a second terminal and a third terminal, the first terminal being coupled to receive an input supply voltage (Vin), the second terminal adapted to provide a regulated output supply voltage (Vout), the third terminal being coupled to receive a regulator control voltage, the voltage regulator comprising:
    a bias circuit comprising:
        a first resistor having a first terminal and a second terminal, the first terminal of the first resistor being coupled to the third terminal of the voltage regulator and being coupled to receive the regulator control voltage;
        a second resistor having a first terminal and a second terminal, the first terminal of the second resistor being coupled to the second terminal of the first resistor, the second terminal of the second resistor being coupled to a ground potential; and
        a third resistor having a first terminal and a second terminal, the first terminal of the third resistor being coupled to the second terminal of the first resistor and the first terminal of the second resistor, the second terminal of the third resistor being coupled to the input supply voltage; and
    a summing circuit having a first terminal, a second terminal, a third terminal, a fourth terminal and a fifth terminal, the first terminal of the summing circuit, forming a first input of the summing circuit, being coupled to the second terminal of the first resistor and the first terminal of the second resistor and the first terminal of the third resistor, the second terminal of the summing circuit, forming a second input of the summing circuit, being coupled to the third terminal of the summing circuit, forming an output of the summing circuit to provide the regulated output supply voltage responsive to the regulator control voltage and the input supply voltage, the fourth terminal of the summing circuit, forming a third input of the summing circuit, being coupled to the input supply voltage, the fifth terminal of the summing circuit being coupled to the ground potential.

2. A voltage regulator according to claim 1 wherein the summing circuit further comprises an operational amplifier.

3. A voltage regulator according to claim 1 wherein voltage regulator has a first operating stage and a second operating stage, each determined by the bias circuit, the first operating stage of the bias circuit setting the regulated output supply voltage to be equal to the input supply voltage when the input supply voltage is less than or equal to a first predetermined voltage responsive to the regulator control voltage and the input supply voltage, and the second operating stage of the bias circuit setting the regulated output supply voltage to be equal to a predetermined function of the input supply voltage when the input supply voltage is between a first predetermined voltage and a second predetermined voltage, greater than the first predetermined voltage, responsive to the regulator control voltage and the input supply voltage.

4. A voltage regulator according to claim 1 further comprising:
    a voltage limiting circuit having a first terminal and a second terminal, the first terminal of the voltage limiting circuit being coupled to the second terminal of the first resistor and the first terminal of the second resistor and the first terminal of the third resistor, the second terminal of the voltage limiting circuit being coupled to the ground potential.

5. A voltage regulator according to claim 4 wherein the voltage limiting circuit further comprises a zener diode.

6. A voltage regulator according to claim 4 wherein the voltage regulator has a third operating stage, determined by the voltage limiting circuit, setting the regulated output supply voltage to be equal to a maximum predetermined voltage when the regulated output supply voltage is greater than or equal to a second predetermined voltage responsive to the regulator control voltage and the input supply voltage.

7. A voltage regulator having a first terminal, a second terminal and a third terminal, the first terminal being coupled to receive an input supply voltage (Vin), the second terminal adapted to provide a regulated output supply voltage (Vout), the third terminal being coupled to receive a regulator control voltage, the voltage regulator comprising:
    a bias circuit comprising:
        a first resistor having a first terminal and a second terminal, the first terminal of the first resistor being coupled to the third terminal of the voltage regulator and being coupled to receive the regulator control voltage;
        a second resistor having a first terminal and a second terminal, the first terminal of the second resistor being coupled to the second terminal of the first resistor, the second terminal of the second resistor being coupled to a ground potential; and
        a third resistor having a first terminal and a second terminal, the first terminal of the third resistor being coupled to the second terminal of the first resistor and the first terminal of the second resistor, the second terminal of the third resistor being coupled to the input supply voltage;
    a summing circuit having a first terminal, a second terminal, a third terminal, a fourth terminal and a fifth terminal, the first terminal of the summing circuit, forming a first input of the summing circuit, being coupled to the second terminal of the first resistor and the first terminal of the second resistor and the first terminal of the third resistor, the second terminal of the summing circuit, forming a second input of the summing circuit, being coupled to the third terminal of the summing circuit, forming an output of the summing circuit to provide the regulated output supply voltage responsive to the regulator control voltage and the input supply voltage, the fourth terminal of the summing circuit, forming a third input of the summing circuit, being coupled to the input supply voltage, the fifth terminal of the summing circuit being coupled to the ground potential; and a voltage limiting circuit having a first terminal and a second terminal, the first terminal of the voltage limiting circuit being coupled to the second terminal of the first resistor and the first terminal of the second resistor and the first terminal of the third resistor, the second terminal of the voltage limiting circuit being coupled to the ground potential, wherein voltage regulator has a first operating stage and a second operating stage, each determined by the bias circuit, the first operating stage of the bias circuit setting the regulated output supply voltage to be equal to the input supply voltage when the input supply voltage is less than or equal to a first predetermined voltage responsive to the regulator control voltage and the input supply voltage, and the second operating stage of the bias circuit setting the regulated output supply voltage to be equal to a predetermined function of the input supply voltage when the input supply voltage is between a first predetermined voltage and a second predetermined voltage, greater than the first predetermined voltage, responsive to the regulator control voltage and the input supply voltage, and wherein the voltage regulator has a third operating stage, determined by the voltage limiting circuit, setting the regulated output supply voltage to be equal to a maximum predetermined voltage when the regulated output supply voltage is greater than or equal to a second predetermined voltage responsive to the regulator control voltage and the input supply voltage.

8. A voltage regulator according to claim 7 wherein the summing circuit further comprises an operational amplifier.

9. A voltage regulator according to claim 7 wherein the voltage limiting circuit further comprises a zener diode.

10. A telematics communication system comprising:

a telematics control unit;

a transceiver being coupled to the telematics control unit and being coupled to receive an input supply voltage (Vin) from a battery that is charged by an alternator in an automotive vehicle, the transceiver including:

a voltage regulator having a first terminal, a second terminal and a third terminal, the first terminal being coupled to receive the input supply voltage, the second terminal adapted to provide a regulated output supply voltage (Vout), the third terminal being coupled to receive a regulator control voltage, the voltage regulator including:

a bias circuit comprising:

a first resistor having a first terminal and a second terminal, the first terminal of the first resistor being coupled to the third terminal of the voltage regulator and being coupled to receive the regulator control voltage;

a second resistor having a first terminal and a second terminal, the first terminal of the second resistor being coupled to the second terminal of the first resistor, the second terminal of the second resistor being coupled to a ground potential; and a third resistor having a first terminal and a second terminal, the first terminal of the third resistor being coupled to the second terminal of the first resistor and the first terminal of the second resistor, the second terminal of the third resistor being coupled to the input supply voltage; and a summing circuit having a first terminal, a second terminal, a third terminal, a fourth terminal and a fifth terminal, the first terminal of the summing circuit, forming a first input of the summing circuit, being coupled to the second terminal of the first resistor and the first terminal of the second resistor and the first terminal of the third resistor, the second terminal of the summing circuit, forming a second input of the summing circuit, being coupled to the third terminal of the summing circuit, forming an output of the summing circuit to provide the regulated output supply voltage responsive to the regulator control voltage and the input supply voltage, the fourth terminal of the summing circuit, forming a third input of the summing circuit, being coupled to the input supply voltage, the fifth terminal of the summing circuit being coupled to the ground potential; and a transmitter having a power amplifier being coupled to receive the regulated output supply voltage;

a user interface being coupled to the telematics control unit and the transceiver; and an antenna being coupled to the transceiver.

11. A voltage regulator according to claim 10 wherein the summing circuit further comprises an operational amplifier.

12. A voltage regulator according to claim 10 wherein voltage regulator has a first operating stage and a second operating stage, each determined by the bias circuit, the first operating stage of the bias circuit setting the regulated output supply voltage to be equal to the input supply voltage when the input supply voltage is less than or equal to a first predetermined voltage responsive to the regulator control voltage and the input supply voltage, and the second operating stage of the bias circuit setting the regulated output supply voltage to be equal to a predetermined function of the input supply voltage when the input supply voltage is between a first predetermined voltage and a second predetermined voltage, greater than the first predetermined voltage, responsive to the regulator control voltage and the input supply voltage.

13. A voltage regulator according to claim 10 further comprising:

a voltage limiting circuit having a first terminal and a second terminal, the first terminal of the voltage limiting circuit being coupled to the second terminal of the first resistor and the first terminal of the second resistor and the first terminal of the third resistor, the second terminal of the voltage limiting circuit being coupled to the ground potential.

14. A voltage regulator according to claim 13 wherein the voltage limiting circuit further comprises a zener diode.

15. A voltage regulator according to claim 13 wherein the voltage regulator has a third operating stage, determined by the voltage limiting circuit, setting the regulated output supply voltage to be equal to a maximum predetermined voltage when the regulated output supply voltage is greater than or equal to a second predetermined voltage responsive to the regulator control voltage and the input supply voltage.

16. An automotive vehicle comprising:

an alternator;

a battery being charged by the alternator and adapted to provide an input supply voltage (Vin) for electrical devices in the automotive vehicle;

a telematics communication system including;
    a telematics control unit;
    a transceiver being coupled to the telematics control unit and being coupled to receive the input supply voltage from the battery, the transceiver including:
        a voltage regulator having a first terminal, a second terminal and a third terminal, the first terminal being coupled to receive the input supply voltage, the second terminal adapted to provide a regulated output supply voltage (Vout), the third terminal being coupled to receive a regulator control voltage, the voltage regulator including:
            a bias circuit comprising:
                a first resistor having a first terminal and a second terminal, the first terminal of the first resistor being coupled to the third terminal of the voltage regulator and being coupled to receive the regulator control voltage;
                a second resistor having a first terminal and a second terminal, the first terminal of the second resistor being coupled to the second terminal of the first resistor, the second terminal of the second resistor being coupled to a ground potential; and
                a third resistor having a first terminal and a second terminal, the first terminal of the third resistor being coupled to the second terminal of the first resistor and the first terminal of the second resistor, the second terminal of the third resistor being coupled to the input supply voltage; and
            a summing circuit having a first terminal, a second terminal, a third terminal, a fourth terminal and a fifth terminal, the first terminal of the summing circuit, forming a first input of the summing circuit, being coupled to the second terminal of the first resistor and the first terminal of the second resistor and the first terminal of the third resistor, the second terminal of the summing circuit, forming a second input of the summing circuit, being coupled to the third terminal of the summing circuit, forming an output of the summing circuit to provide the regulated output supply voltage responsive to the regulator control voltage and the input supply voltage, the fourth terminal of the summing circuit, forming a third input of the summing circuit, being coupled to the input supply voltage, the fifth terminal of the summing circuit being coupled to the ground potential; and
        a transmitter having a power amplifier being coupled to receive the regulated output supply voltage;
    a user interface being coupled to the telematics control unit and the transceiver; and
    an antenna being coupled to the transceiver.

17. A method performed by a voltage regulator comprising the steps of:
    receiving an input supply voltage (Vin) and a regulator control voltage, the regulator control voltage having a first voltage level and a second voltage level; and
    producing a regulated output supply voltage (Vout) having a first voltage level, being a ground potential, responsive to the first voltage level of regulator control voltage and having a second voltage level, being variable, responsive to the second voltage level of regulator control voltage and the input supply voltage,
        wherein the second voltage level of the regulated output supply voltage is set:
            equal to the input supply voltage when the input supply voltage is less than or equal to a first predetermined voltage, and
            equal to a predetermined function of the input supply voltage when the input supply voltage is between a first predetermined voltage and a second predetermined voltage, greater than the first predetermined voltage, to create an increasing voltage delta between the input supply voltage and the regulated output supply voltage.

18. A method performed by a voltage regulator according to claim 17 wherein the second voltage level of the regulated output supply voltage is set equal to a function of the input supply voltage according to the equation: Vout=mVin+b, wherein "m" is a first slope of a line forming a first linear relationship between Vin and Vout, and "b" is a constant that determines an offset of the line from an origin.

19. A method performed by a voltage regulator according to claim 17 wherein the first slope for the first linear relationship Vout=mVin+b is positive and less than a second slope for a second linear relationship Vout=Vin.

20. A method performed by a voltage regulator according to claim 17 wherein the second voltage level of the regulated output supply voltage is equal to:
    a maximum predetermined voltage when the regulated output supply voltage is greater than or equal to the second predetermined voltage.

21. In a telematics communication system adapted for use in an automotive vehicle, a method for reducing alternator whine noise while giving operational priority to a transmit power output level of a transmitter using a voltage regulator, the voltage regulator being coupled to receive an input voltage supply (Vin) from a battery being charged by an alternator, being coupled to receive a regulator control voltage, and being adapted to provide a regulated output supply voltage (Vout), the regulated output supply voltage being coupled to a power amplifier in the transmitter, the method comprising the steps of:
    producing a regulated output supply voltage (Vout), being variable, responsive to the regulator control voltage and the input supply voltage,
        wherein the regulated output supply voltage is set:
            equal to the input supply voltage when the input supply voltage is less than or equal to a first predetermined voltage to permit the presence of the alternator whine noise on the regulated output supply voltage while giving operational priority to the transmit power output level of the transmitter, and
            equal to a predetermined function of the input supply voltage when the input supply voltage is between a first predetermined voltage and a second predetermined voltage, greater than the first predetermined voltage, to create an increasing voltage delta between the input supply voltage and the regulated output supply voltage, thereby reducing the alternator whine noise on the regulated output supply voltage while continuing to meet operational requirements of the transmit power output level of the transmitter.

* * * * *